(12) United States Patent
Ruf (10) Patent No.: US 8,392,392 B1
(45) Date of Patent: Mar. 5, 2013

(54) VOICE REQUEST BROKER

(75) Inventor: Michael P. Ruf, Parkland, FL (US)

(73) Assignee: Smith Micro Software, Inc, Aliso Viejo, CA (US)

( * ) Notice: Subject to any disclaimer, the term of this patent is extended or adjusted under 35 U.S.C. 154(b) by 504 days.

(21) Appl. No.: 12/209,145

(22) Filed: Sep. 11, 2008

(51) Int. Cl.
*G06F 17/30* (2006.01)

(52) U.S. Cl. .......... 707/706; 707/708; 707/709

(58) Field of Classification Search ......... 707/706, 707/708, 709
See application file for complete search history.

(56) References Cited

U.S. PATENT DOCUMENTS

| 6,901,366 B1 * | 5/2005 | Kuhn et al. ........ 707/E17.071 |
| 7,844,594 B1 * | 11/2010 | Holt et al. ............. 707/709 |
| 7,933,895 B2 * | 4/2011 | Amjadi ............... 707/722 |
| 8,121,997 B2 * | 2/2012 | Raciborski ............ 707/706 |
| 2002/0174089 A1 * | 11/2002 | Tenorio .............. 707/1 |
| 2004/0030689 A1 * | 2/2004 | Anderson et al. ......... 707/3 |
| 2004/0267735 A1 * | 12/2004 | Melham .............. 707/3 |
| 2005/0234779 A1 * | 10/2005 | Chiu et al. ............ 705/24 |
| 2006/0100876 A1 * | 5/2006 | Nishizaki et al. ........ 704/257 |
| 2008/0021755 A1 * | 1/2008 | Jones et al. ........... 705/8 |
| 2008/0082515 A1 * | 4/2008 | Gould ............... 707/4 |
| 2009/0325546 A1 * | 12/2009 | Reddy et al. .......... 455/414.1 |
| 2010/0082590 A1 * | 4/2010 | Nye ................ 707/706 |

\* cited by examiner

*Primary Examiner* — Rehana Perveen
*Assistant Examiner* — Tiffany Thuy Bui
(74) *Attorney, Agent, or Firm* — Workman Nydegger (57) ABSTRACT

Search requests may be initiated by a wireless communication device and performed by a voice request broker (VRB). The VRB may evaluate the applicability of various criteria and may select at least one search engine to process the search request according to the applicable criteria. The VRB may transmit the search request to the at least one search engine and the at least one search engine may return a list of one or more results. The VRB may evaluate the applicability of various criteria and may re-sort the results according to applicable criteria. The VRB may transmit the re-sorted results to the wireless communication device from which the search request is initiated.

18 Claims, 5 Drawing Sheets

VOICE REQUEST BROKER

BACKGROUND

1. The Field of the Invention

The present invention relates generally to processing search requests. More particularly, embodiments of the invention may relate to systems and methods for brokering a voice search requests that originate on a mobile device to a search engine.

2. The Relevant Technology

The size of the World Wide Web presents users with enormous amounts of data that is just a click away. Almost anything a user desires to learn of, purchase or view can be found on the World Wide Web by entering an appropriate URL in a web browser connected to the Internet. Often, however, a user may not know the URL corresponding to the data the user wishes to find. Thus, search engines have been developed which may assist in locating information on the World Wide Web.

Search engines allow a user to ask for content meeting specific criteria and then retrieve a list of items that match those criteria. Typically a user enters a word or phrase (a "search request") and a search engine looks for items containing or excluding some combination of the word(s) and/or phrase(s) entered by the user. Traditional search engines maintain indexes which are updated frequently in various manners, including the use of webcrawlers. When a user enters a search request, a search engine looks up its index and provides a listing of best-matching web pages according to its search criteria. Meta-search engines, in contrast, do not maintain an index. Instead, meta-search engines receive a search request, submit it to multiple traditional search engines and then combine the results in some way and present them to the user.

Although many web search requests are initiated from PCs and desktop computers, the evolution of mobile phones to include Internet browsing capabilities enables mobile phone users to initiate search requests from their handsets as well. This may be particularly useful to a device user in need of information but lacking immediate access to a PC or desktop computer. A typical search request may be initiated on a mobile phone by browsing the web to select a search engine and typing in a search request after which the search engine returns its results. Other search requests may be initiated and submitted to a search engine via the SMS protocol after which the search engine may send its results in one or more SMS messages.

Some search engines monetize the processing of search requests using an advertising-based revenue model. Generally, however, a carrier providing service for a mobile device requesting a search does not share the search revenue. Many carriers do receive some benefit insofar as SMS messages or other data are exchanged, but many carriers want to receive more revenue for searches performed on the carriers' respective networks.

Accordingly, there currently exists a need in the art for improving a wireless service carrier's ability to generate revenue from search requests.

SUMMARY

These and other limitations are overcome by embodiments of the invention, which relate to methods and systems for processing search requests. In particular, embodiments of the invention enable a wireless services carrier to broker a search request to a search engine based on various criteria.

According to one embodiment of the invention, a voice request broker receives a search request from a device. The search request can be verbal (such as an instant voice message), text, or in another format or message type. The voice request broker then assesses the search request to select one or more search engines to perform the search request, dispatches the search request to the one or more selected search engines and receives the results.

As the voice request broker assesses the search request, the voice request broker may parse the search request to identify a keyword, search term or query format. The form of the search request may have an impact on which search engine is selected for the search. Also, the voice request broker may evaluate the search request to determine whether search criteria apply. The voice request broker can then select one or more search engines to perform the requested search based on which criteria apply. The search request is then transmitted to the selected search engines.

The results of the search request can also be transmitted to the user's device in various ways. For example, the results can be re-sorted using additional results criteria (which may be the same as or different from the search criteria). Alternatively, the results can simply be forwarded to the user's device as they are generated by the selected search engine. When more than one search engine is selected, the results can be combined in various ways. Also, the results can be delivered as SMS messages, MMS messages, in a WAP browser window, and the like.

Embodiments of the invention for brokering a search request can be used in conjunction with wireless communication devices as well as land line devices, and in RF networks as well as IP networks. In some embodiments of the invention a search request is transmitted to only one search engine while in other embodiments a search request is transmitted to two or more search engines. The search engines used in conjunction with the invention include traditional search engines which maintain their own indexes, databases or catalogues and meta-search engines which send search requests to multiple traditional search engines and combine the returned results.

A device user may use a device to initiate a search request by selecting a dedicated key or in some other way and the search request is transmitted to a voice request broker. The device may be a wireless communication device, in which case the search request may be transmitted to the voice request broker over a radio frequency network. When the search request is conveyed via a person's voice, the voice request broker may transcribe the verbal search request into a text search request using speech recognition software or in some other way.

The voice request broker may use a parser to identify keywords, terms and query formats, which may be used by the voice request broker to evaluate the applicability of search engine selection criteria, which criteria and other data may be stored in memory. The search engine selection criterion may be weighted and a search engine or engines may be selected to process the search request based on the respective weights of the applicable criteria.

These and other advantages and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Reference will now be made to the drawings to describe various aspects of exemplary embodiments of the invention. It should be understood that the drawings are diagrammatic and schematic representations of such exemplary embodiments and, accordingly, are not limiting of the scope of the present invention, nor are the drawings necessarily drawn to scale.

In general, embodiments of the invention are concerned with processing search requests. More particularly, embodiments of the invention enable a search request broker to receive a search request and select a search engine to carry out the search request based on various search engine selection criteria.

A user of a communication device submits a search request to a Voice Request Broker (VRB) through a communication device. The communication devices that may be employed in conjunction with the invention include PCs, landline telephones, cellular telephones, PDAs, laptop computers and any other device capable of sending and receiving data and suitably equipped to establish communication with a network. The VRB receives the search request and parses it to identify keywords and to formulate a search query. The VRB analyzes one or more criteria to determine which search engine among a plurality of search engines is the "best-fit" for handling the search query and submits the search query to the search engine. The search engine performs the search and returns a result or set of results to the VRB. The VRB may apply the same or another set of criteria to the returned results to re-order the results before returning the results to the requesting communication device.

Figure 1:
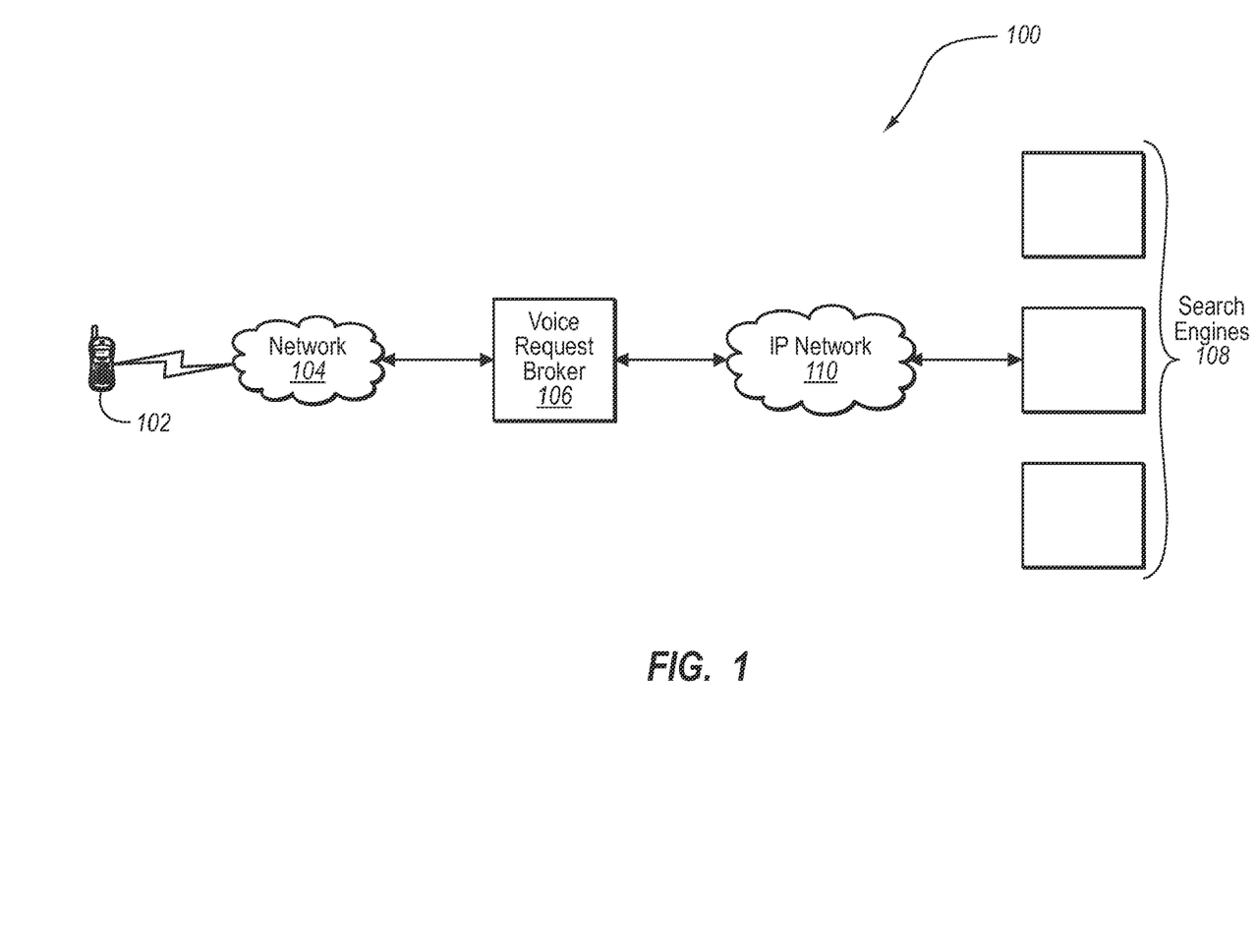
FIG. 1 illustrates one embodiment of a communications network within which search requests may be processed.

FIG. 1 illustrates an exemplary implementation of an operating environment, denoted generally at 100. The communication system 100 includes a communication device 102 configured to send and receive data over a network 104. When the communication device 102 is a mobile telephone, the network 104 may include a cellular RF network. However, the network 104 may also include or represent other types of wired/wireless networks such as, but not limited to, 802.xx networks, Bluetooth access points, wireless access points, IP-based networks, a Public Switched Telephone Network and broadcast networks such as FM radio or satellite radio. The network 104 may also include servers that enable one type of network to interface with another type of network.

The device 102 submits a search request to a Voice Request Broker (VRB) 106. The search request may be submitted using a variety of delivery mechanisms, including a method that transmits a voiced request, MMS, and SMS. Further, the search request may take a variety of forms, including natural language, boolean, and so on.

The VRB 106 receives the search request and performs an initial assessment on the request to determine which search engine or engines to broker the search request to. Following this assessment, the VRB may submit the search request to one or more search engines 108 over the IP network 110. The search engines 108 may be traditional search engines, which often use a webcrawler to retrieve numerous web pages, which are then stored and indexed. When a search query is submitted, traditional search engines often provide a listing of best-matching web pages according to their respective criteria, usually with a short summary containing a result page's title and sometimes parts of the text. The search engines 108 may also be meta-search engines, which submit their search requests to numerous traditional search engines and return a set of combined results to the user.

Typically, the VRB 106 determines which search engine 108 to broker a search query to based on a set of search engine selection criteria. These criteria are often applied or weighted in such a way as to enable or maximize revenue for a wireless carrier facilitating communication between the device 102 and a search engine 108. The search engine selection criteria include, but are not limited to, the following: (1) reserved queries, (2) search engine performance statistics, (3) match between search keywords and the specialty of a search engine, (4) the context of the phone, (5) user profiles, (6) a search engine's ability to return rich content as a result of the search and/or (7) expected monetization of the search. In one embodiment, these same criteria and/or other criteria may also be used to re-sort results prior to transmitting them to a communication device 102.

Reserved Queries

In various embodiments of the invention, certain queries may be reserved by the carrier to be automatically brokered to certain search engines. For example, the carrier may sell services or products related to mobile telephony, such as ringtones wallpaper, music, JAVA applications, etc. The carrier has a financial interest in being at the top of a list of search results for all of these products because the user viewing the search results may purchase the product. The best way to insure that the carrier is at the top of the results list is to handle queries for these terms and others reserved by the carrier using an in-house search engine. When a device 102 searches for one of these reserved terms, such as "ringtone," the VRB may use the in-house search engine to perform the search. The in-house search engine then returns a list of results which may include a link to carrier-sold ringtones at the top of the list, possibly followed by other results.

The carrier may also reserve queries "purchased" by third parties or the search engines 108. For example, a pizza company, "PizzaCo," may desire to be returned at the top of a list of results when a device 102 requests a search on the term "pizza." PizzaCo may do this by purchasing the query "pizza." When a reserved query is purchased by a third party, as is the case here, the VRB dispatches search requests for the reserved query to the in-house search engine, which returns a link or other information about the third party at the top of the list of results. This is similar to the way conventional search engines receive advertising revenue by selling a word to an advertiser and returning that advertiser among a list of "sponsored" results, with the advertiser appearing first, second, third, etc. in the list according to the premium the advertiser pays the search engine or according to some other formula.

A search engine may purchase a query, for example, after an advertiser purchases the query from the search engine. The search engine may do this to maximize exposure to the advertiser's advertisement. Thus, when a VRB receives a query purchased by and reserved for a search engine, the VRB transmits the query to the search engine. In the list of results returned to the VRB, the search engine presumably places the advertiser at the top of the list. Thus, if desired, the carrier may sell search terms to the highest bidders.

The carrier, in addition to reserving keywords or terms, may also reserve query formats such as all queries of the form "how does [something] work?" or all queries originating from devices located in a specific geographic area, and the like.

Search Engine Performance Statistics

The VRB may consider the matched rating of a search engine, which can be measured in terms of user clickthrough. As used herein, the term "user clickthrough" refers to a user clicking on or otherwise selecting a result returned by a search engine. Thus, the VRB may broker a search query to the search engine most likely to return a useful result to the individual requesting the search, i.e., the search engine with the highest matched rating or user clickthrough percentage. In one embodiment, a search engine has an arrangement with the carrier whereby the search engine pays a commission to the carrier based on user clickthrough. In this case, the carrier's revenue for a brokered search is related to a search engine's clickthrough percentage and the commission charged per clickthrough. Thus, the VRB may be configured to track the user clickthrough associated with each search engine and broker a search request to the search engine with the highest user clickthrough, or to the search engine paying the highest commission, or to the search engine having some other combination of user clickthrough and commission.

Match Between Search Keywords and the Specialty of the Search Engine

Some search engines may be specially suited to handle certain keywords, search terms or query formats. For example, an airfare search may be serviced best by a metasearch engine which submits search requests to numerous air travel search engines. Queries in the form of natural language questions may be serviced best by a search engine configured for handling natural language questions. In some embodiments of the invention, a search engine may purchase the keywords, terms or query formats which match the search engine's specialty, just as the search engine may purchase other keywords or terms as described above.

Context of the Phone

In some embodiments of the invention, the VRB 106 may analyze the context of the phone in determining which search engine to submit a search request to. For example, the VRB may consider the geographical location of the device 102 and/or where the user is at in a particular menu when the search is initiated. In an exemplary embodiment, a local search engine 108 may specialize in searching in a particular geographic area. The local search engine may pay the carrier a premium to handle search requests originating from a device located within the particular geographic area. In another exemplary embodiment, a third party or search engine may wish to purchase search requests matching a certain query format when the search is initiated while the device user is in a certain menu of the device 102. For example, a device manufacturer may wish to purchase queries in the format "How do I [do something with my phone]" when the search is initiated while the device user is in the "help" menu of the device.

User Profile

The VRB 106 may broker a search request to a search engine 108 based on what is known about the user, which information may be obtained by reference to a user profile. For instance, the use may create preferences in a user profile in which the user specifies a preference for a particular search engine. When a user requests a search, the VRB 106 submits the search request to the user's preferred search engine.

As another example, data may be collected about the user and stored in the user profile. For example, ringtones, music, and other items and/or services purchased by the user using the device 102 may be tracked and recorded in the user profile. The purchases made and other data (which may have been collected by the carrier when the user enrolled for carrier-provided service and which may include the user's age, sex, place of residence, etc.) stored in the user profile may reveal that the user fits within a certain demographic, such as age group, etc. and/or that the user has a propensity to purchase certain items and/or services. In this case, the VRB can broker a search request to a search engine which, based on the items or services offered by certain of the search engine's advertising clientele, may wish to service search requests for users fitting within a certain demographic, or with known propensities to purchase certain items/services. Other information that may be stored in the user profile and used to determine which search engine 108 to broker a search request to may include other searches the user has done in the past, websites the user has visited, and the like or any combination thereof.

A Search Engine's Ability to Return Rich Content as a Result of the Search

In some embodiments of the invention, the VRB may consider the ability of a search engine to return rich content when brokering a search request. As used herein, "rich content" refers to a broad range of interactive digital media, which may exhibit dynamic motion and/or possibly take advantage of enhanced sensory features such as video, audio and animation. For instance, a search engine may return a script instead of a WAP page or list of results, which script renders an interactive set of information about a particular product. In an exemplary embodiment, a user requests a search on the term "coffee." A search engine may return a map indicating the location of different coffee houses near the user. The map may display a phone number and directions of how to get to a particular coffee house when the user interacts with the map.

Expected Monetization of the Search

The VRB may broker the search request based on the expected monetization of the search. The VRB may analyze and compare all other criteria for brokering a search request and determine which one results in the most revenue for the carrier. For purposes of illustration, the device 102 may request a search on the term "ringtone." Further, the carrier may sell its own ringtones, and the carrier may also have a clickthrough commission contract with one or more search engines. In this case, the carrier earns revenue if the VRB submits the request to the in-house search engine which returns a link to carrier-sold ringtones and the user of device 102 purchases a ringtone from the carrier's ringtone site. Alternately, the carrier earns revenue in the form of a clickthrough commission if the VRB submits the request to a search engine 108 which returns a result to the device 102 that the user clicks on. The carrier is likely to receive greater revenue from selling a ringtone than from a clickthrough commission, thus the VRB submits the search request to the in-house search engine to maximize the carrier's potential profit. Alternately, the VRB can submit the search query to both the in-house search engine and the search engine with which the carrier has a clickthrough commission arrangement. The VRB may then combine the results from each search engine when presenting the results to the user.

After selecting at least one search engine based on one or more of the search engine selection criteria, or based on one or more other criteria, from among the search engines 108 and the in-house search engine, the VRB 106 submits the search query to the at least one selected search engine. In submitting a search query to a search engine, the VRB may also transmit information from a user profile, as well as a user's location, and other information to the search engine to aid the search engine in sorting/prioritizing its results. The results returned to the VRB may also be re-sorted or re-prioritized by the VRB prior to being transmitted to the device 102, according to one or more result re-sorting criteria. The result re-sorting criteria may include the search engine selection criteria and/or other criteria. As an example, the VRB may submit the search query to two different search engines, each of which returns one or more results. The VRB may sort the results according to which search engine has an historically (as recorded by the VRB or as determined from some other source) higher rate of clickthrough, or according to which result (such as a retail outlet, restaurant or other location) is closer to where the device 102 is located, or using some other criteria.

Figure 2:
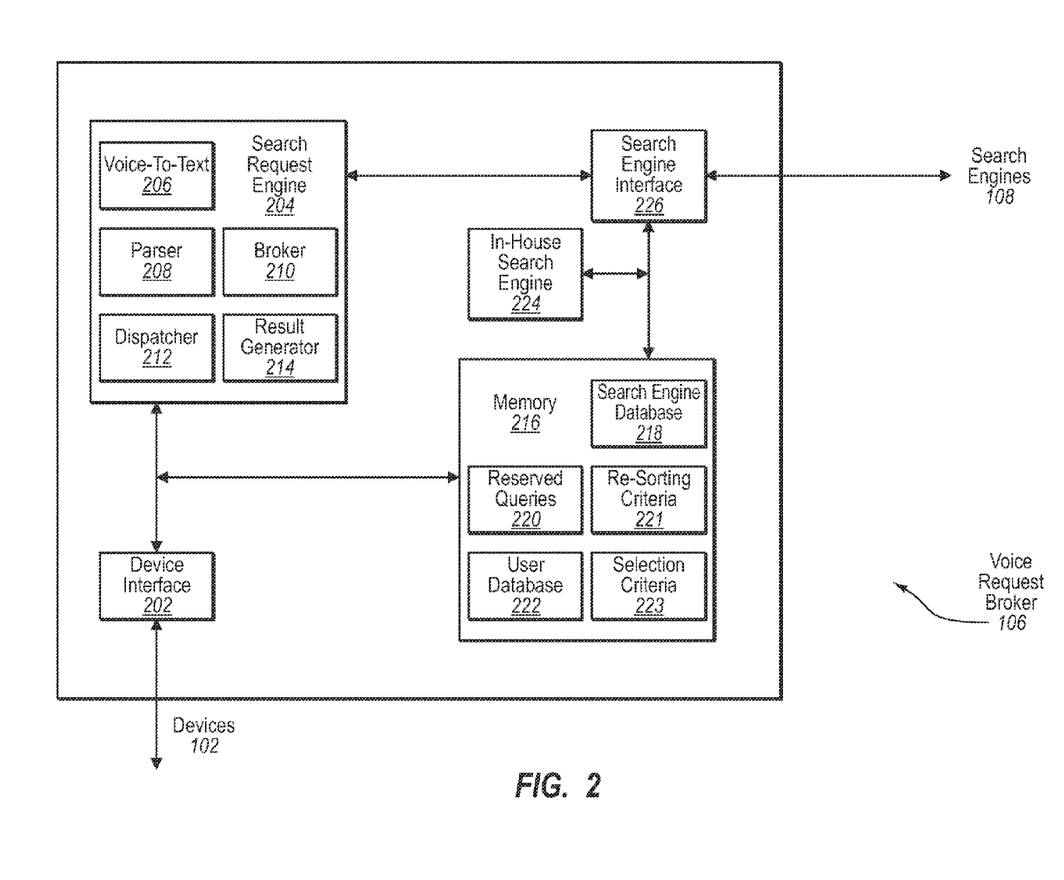
FIG. 2 depicts an exemplary embodiment of a voice request broker.

Reference will now be made to FIG. 2, which illustrates one implementation of a Voice Request Broker (VRB) 106. In the exemplary embodiment, the VRB 106 operates in conjunction with search engines 108 and mobile communication devices 102. Typically, the VRB 106 includes a server or general purpose computer, with suitable interface hardware for receiving, transmitting and storing search queries. The VRB is programmed in software to carry out the functions described herein. This software may be conveyed to the VRB in electronic form, over a network, for example, or it may alternatively be provided on tangible media, such as optical, magnetic or non-volatile electronic storage media.

A user of a communication device 102 submits a search request to the VRB 106, which is received through the device interface 202. The search request can be verbal or text or in another format. The search request can be sent as an SMS message, an MMS message, an instant voice message, and the like. Search requests are processed by the search request engine 204, which includes a voice-to-text module 206, a parser 208, a broker 210, a dispatcher 212 and a result generator 214. In an exemplary embodiment, the search request submitted by the device is a voice search request. The voice search request may be submitted by the device user in real time, or the voice search request may be submitted by the device user as a store-and-forward MMS voice message, or in any other voice format. The voice-to text module 206 is a speech recognition program that transcribes the voice request into a text string and may perform the transcription automatically, manually by humans, or via a combination of humans and automated techniques. In another embodiment, the request submitted by the device user is a text string submitted via SMS, HTTP or some other protocol and the search request engine may process the request without first transcribing it.

After the voice-to-text module 206 has extracted a text query from the voice request, the parser 208 identifies keywords, search terms, query formats and other relevant data in the text query. For example, the parser 208 may drop articles and prepositions from a query and identify nouns and verbs or identify a query format as being natural language or boolean. The broker 210 analyzes the parsed text query to determine which criteria apply and weights the various criteria to determine which search engine to dispatch the query to. The weight assigned to any criterion may be a constant value assigned by an administrator of the VRB, which value may be reassigned if desired. For instance, the carrier may assign the greatest weight to a user's preferred search engine. In another case, the carrier may assign the greatest weight to maximizing revenue.

In a typical embodiment, the broker 210 accesses data stored in memory 216 to assess a query. The memory 216 may comprise primary storage including main storage, cache memory and registers as well as secondary storage. Various databases within the memory 216 may store the data used by the broker 210, including a search engine database 218, reserved queries 220, a user database 222, search engine selection criteria 223 and result re-sorting criteria 221. The search engine database 218 stores information relating to a search engine's matched rating, result return capabilities and addressing information. The VRB may periodically receive clickthrough data from a usage accountant 402 (depicted in FIG. 4) configured to collect this data and update the search engine database 218 for each search engine.

The reserved queries 220 comprise the keywords, search terms, query formats and other queries reserved by the carrier for itself, third parties or search engines. For instance, the carrier may reserve search terms such as "ringtone," "wallpaper," "JAVA application," etc. for itself, or a third party may purchase a search term such as "pizza" as described above. As another example, one of the search engines 108 may purchase a search term such as "coffee," a query format such as "How do I . . . ?", all queries originating from devices located within a particular geographic area or some other type of query. As indicated previously, the search request may be verbal. Thus, the voice request broker may recognize both text and or verbal query formats.

When the broker receives a query, it compares it to the reserved queries 220 to ascertain the applicability of the reserved queries criterion. Depending on the weight of this criterion, the query may be dispatched to an in-house search engine 224 if it has been reserved by the carrier for itself or it has been purchased by a third party or it may be dispatched to a purchasing search engine if it has been purchased by a search engine 108.

The user database 222 includes user profiles for the devices 102. For example, users may specify a preferred search engine and store this information in their user profile. Information about a user, such as the user's age, sex and mailing address may be obtained and stored in the VRB when the user enrolls for service with the carrier, and additional information such as the user's purchasing habits, prior search requests, etc. may be gathered by the usage accountant 402 on the device 102 and periodically transmitted to the VRB 106. The user profiles stored in the user database 222 may remain permanently in the memory 216 of the VRB 106, or the profiles may be stored in the memory of the individual communication devices 102 and transmitted temporarily to the VRB 106, or any combination thereof.

Figure 3:
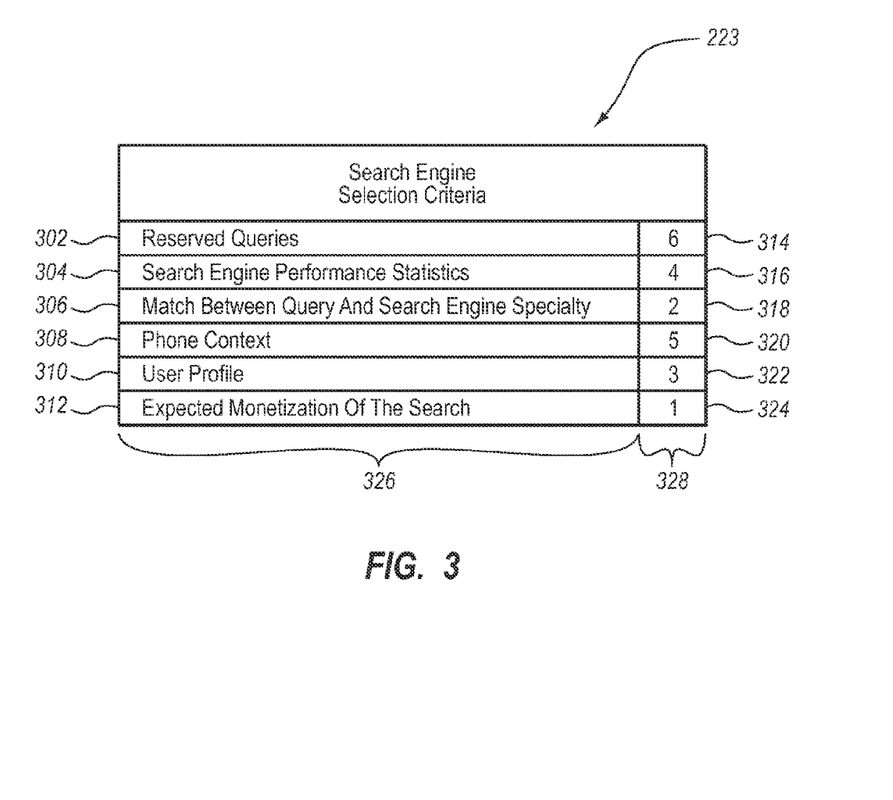
FIG. 3 illustrates a criteria database according to embodiments of the invention.

The search engine selection criteria database 223, one embodiment being illustrated in more detail in FIG. 3, contains an entry for each criterion 326 and a corresponding assigned weight 328. The first assigned weight 314 corresponds to the first criterion 302 and the second assigned weight 316 corresponds to the second criterion 304 and so on. For example, the reserved queries criterion 302 has been assigned a weight of 6 while the match between query and search engine specialty criterion 306 has been assigned a weight of 2. In this case, if a query is received by the VRB which is both a reserved query and a match for a search engine specialty, the reserved query criterion may have greater influence over search engine selection than the matched query-specialty criterion since the former has been assigned greater weight. In the embodiment shown, the possible weight values have been chosen to create a sequential criteria hierarchy and reflect the total number of criteria. However, the values may be scaled and different criteria may share the same weight. For instance, the values can be scaled to 100 and the phone context 308 and user profile 310 criteria may both be assigned a weight of 75. Furthermore, each of the criterion shown may encompass multiple criteria, such as the user profile criterion 310, which encompasses a user preferences criterion and a user demography (age, sex, purchase propensities, etc.) criterion. Thus, the search engine selection criteria 223 may comprise more criteria than those illustrated in the embodiment of FIG. 3.

In order to select a search engine, the broker 210 may begin assessing the most heavily weighted criterion and proceed to assess each successive next-heaviest weighted criterion until a most heavily weighted applicable criterion is found. This may be done by identifying the most heavily weighted criterion in the best-fit criteria 223 and then using the other data stored in the memory 216 to evaluate the criterion's applicability. If the criterion does not apply, the broker identifies and evaluates the next heaviest weighted criterion and so on. The most-heavily weighted applicable criterion may determine the selected search engine to which a query is dispatched. In other embodiments of the invention, the broker 210 may identify multiple applicable criteria and the query may be dispatched to multiple selected search engines, or the multiple applicable criteria may be compared and the one that produces the highest potential revenue may determine the selected search engine.

Once the broker 210 has selected the search engine for a query, the dispatcher 212 prepares the query for transmission to the selected search engine. The dispatcher 212 may refer to the search engine database 218 to determine the address for the selected search engine and address the query accordingly. The dispatcher 212 may include in the query the terms and keywords parsed out of the text string by the parser 208 and/or the original text query, which in the case of a voice search request is produced by the voice-to-text module 206. Optionally, the dispatcher 212 may attach additional data to the query such as the location of the device 102, or data from the user database 222 regarding the user of the device, or other additional information which the selected search engine may utilize in its evaluation of the query.

The VRB 106 includes a search engine interface module 226 that interfaces with the search engines 108 and the in-house search engine 224. The search engine interface module 226 enables the VRB 106 to communicate with the search engines 108, 224 and may utilize HTTP or some other protocol to transfer search requests between the VRB and the search engines. Upon completing a search request, a search engine 108, 224 returns a result or list of results to the VRB through the search engine interface module 226. In one embodiment, the in-house search engine 224 is integrated with the VRB 106. In another embodiment it is not integrated with the VRB. Instead, the in-house search engine 224 may reside in the IP network 110 or any other place so long as it may still communicate with the VRB and perform the other functions described herein.

The result generator 214 receives the result or list of results returned by the search engines 108 and may re-order or re-sort the results prior to transmitting them to the device 102. In one embodiment, the result generator 214 transmits the results to the communication device 102 without re-sorting them. In another embodiment, the result generator 214 re-sorts the results according to the result re-sorting criteria 221. For instance, the result generator may determine that one result in a list of results relates to a location near where the device 102 is located. The result generator may re-sort the results list so that the result relating to the location near the device 102 appears in the result list before the results not relating to locations near the device 102. The result re-sorting criteria 221 may be structured similar to the search engine selection criteria 223 as shown in FIG. 3, with an entry for each criterion and a corresponding assigned weight. The criteria contained in the result re-sorting criteria 221 may be different or the same as those in the search engine selection criteria 223. In some embodiments of the invention, there is no result re-sorting criteria 221 and the result generator may refer to the search engine selection criteria to re-sort results. Once the results have been re-sorted the search request engine 204 transmits the results to the communication device 102 via the device interface 202.

Figure 4:
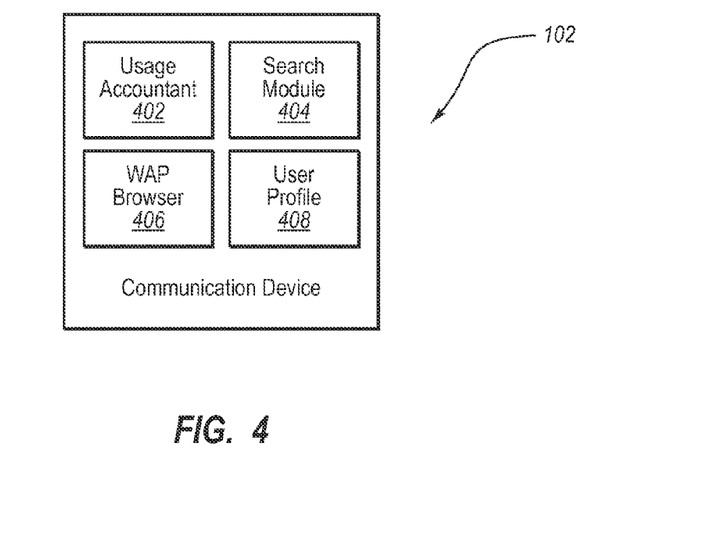
FIG. 4 illustrates an embodiment of a communication device for initiating a search request.

Turning attention now to FIG. 4, details are provided concerning aspects of a communication device 102, which is suitably equipped to establish a connection with one or more networks and send and receive data, particularly search requests and results. The communication device 102 may include a usage accountant 402, a search module 404, a WAP browser 406 and a user profile 408.

In an exemplary embodiment of the invention, a user of the communication device 102 initiates a search request using the search module 404. The search module 404 is an interface which enables the user to submit a search request to the VRB 106, without browsing the Internet and choosing a search engine, or submitting an SMS search request to a search engine. Advantageously, using the VRB to perform a search may permit a wireless carrier to receive more revenue from a search than it normally would from the data transmission involved when a user browses the internet, chooses a search engine and requests a search, or when the user submits an SMS search request. Furthermore, the VRB has access to user data not normally available to a search engine, which may permit the VRB or a search engine performing a search to sort results with better accuracy.

In some embodiments of the invention, the user depresses or selects a dedicated button or key to initiate a search query with the VRB, speaks the desired search query and the search query is transmitted to the VRB. Depressing the dedicated button may initiate a push-to-talk session or a conventional voice call with the VRB such that the query is submitted in real time. Alternately, depressing the dedicated button may cause a voice message to be recorded and transmitted to the VRB upon completion of the recording, in which case the Multimedia Messaging Service (MMS) protocol or other protocol may be used for delivery of the query. As yet another alternative, depressing the dedicated button may open an SMS client on the device 102 and permit the device user to type and send the search query as an SMS message to the VRB.

Although some embodiments of the invention implement the use of a dedicated button or key, such a dedicated button or key is not necessary to practice the invention. In one embodiment, the device user may initiate a search query with the VRB by choosing a "search" option from a menu. In another embodiment, the device user may dial a phone number to initiate a conventional voice call with the VRB and thereby submit a query. The device user may also create and send a voice, MMS, or SMS query without the use of the search module 404 by creating the message and addressing it to the VRB using a suitable client.

Data about the user and the user's preferences may be stored in the user profile 408. The user may specify a preferred search engine for the user's searches, or the user may specify a preference for a quickest search engine, or the user may specify a preference for a search engine which on average returns the most relevant results, or the user may specify other preferences. Other user data may be stored in the user profile 408, including the user's age, sex, address, and so on. In some embodiments, the search module 404 may attach data from the user profile 408 to search requests submitted to the VRB.

Search requests are sent to the VRB and eventually a result or list of results is returned to the communication device 102. In a typical embodiment, the results are displayed using the WAP browser 406, although they may be displayed using some other application on the device 102. For instance, the search results may be returned in one or more SMS messages and displayed on the device 102 using an SMS client. Each result may comprise a link to a WAP webpage, rich content such as an interactive map, a telephone number or address, and the like or any combination thereof. The usage accountant 402 may track the user's interactions, if any, with the returned results. For instance, the usage accountant 402 may track the user's clickthrough responses to returned results and periodically transmit this information to the VRB.

Figure 5:
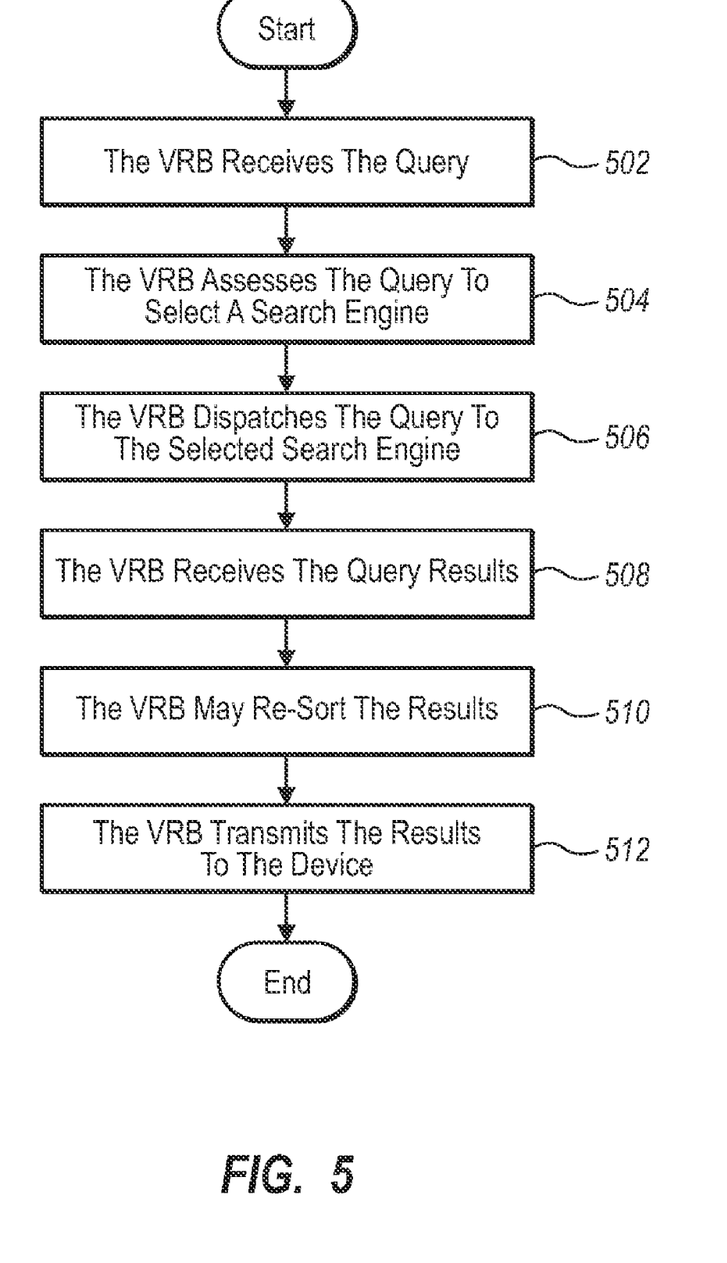
FIG. 5 is a flowchart illustrating a process for brokering a search query to a search engine.

FIG. 5 illustrates an exemplary process for brokering a search query to a search engine. The process begins when a VRB 106 receives 502 a search query from a communication device 102 via a network. In some embodiments of the invention, the search query is a voice query and the VRB transcribes the query into a text string using speech recognition software or in some other manner. In other embodiments of the invention, the search query is an SMS or other type of text query and it is unnecessary to transcribe the request. Additionally, the VRB may parse the query to identify search terms, keywords and a query format.

The VRB assesses 504 the query to select at least one search engine to service the request. The VRB may make this assessment by evaluating the applicability of various weighted search engine selection criteria including whether the query is a reserved query, the performance statistics of the available search engines, the degree to which a query matches the specialty of a search engine, the context of the phone, a user profile associated with the requesting communication device 102, a search engine's ability to return rich content as a result of the search and expected monetization of the search. For instance, queries for ringtones, cellular phone wallpaper, JAVA applications and other products and services that the carrier sells or otherwise has an interest in may be reserved by the carrier and dispatched to the carrier's in-house search engine. Queries reserved due to being purchased by a search engine may be dispatched to the purchasing search engine. Queries submitted by a user having a preferred search engine specified in the user's profile may be dispatched to the preferred search engine, and so on. When various criteria apply to a query, the criterion weighted most heavily may determine which search engine is the selected or best-fit search engine for the query, or there may be multiple selected search engines, or the criteria may be compared in other ways.

The VRB selects at least one best-fit search engine and dispatches 506 the query to the at least one selected search engine. In one embodiment the VRB dispatches the search query to only one search engine, while in another embodiment the VRB dispatches the query to two or more search engines. The at least one selected search engine performs the search request and returns one or more results, which are received 508 by the VRB.

The VRB may then transmit 512 the results to the communication device 102. In one embodiment, the VRB transmits the results to the devices 102 in the same order in which the results are received. However, the VRB may also apply the search engine selection criteria, the result re-sorting criteria or some other criteria to re-sort 510 the results prior to transmitting them to the communication device. For instance, the VRB may dispatch 506 the search query to two different search engines and then receive 508 the results from the search engines. Rather than displaying the results in the order in which they are returned by the search engines (e.g., results from the first search engine followed by results from the second search engine), the VRB may apply the weighted result re-sorting criteria to re-sort 510 or intermingle the results from both search engines. The VRB may also be configured to eliminate redundant results and other results from a set of results.

Figure 6:
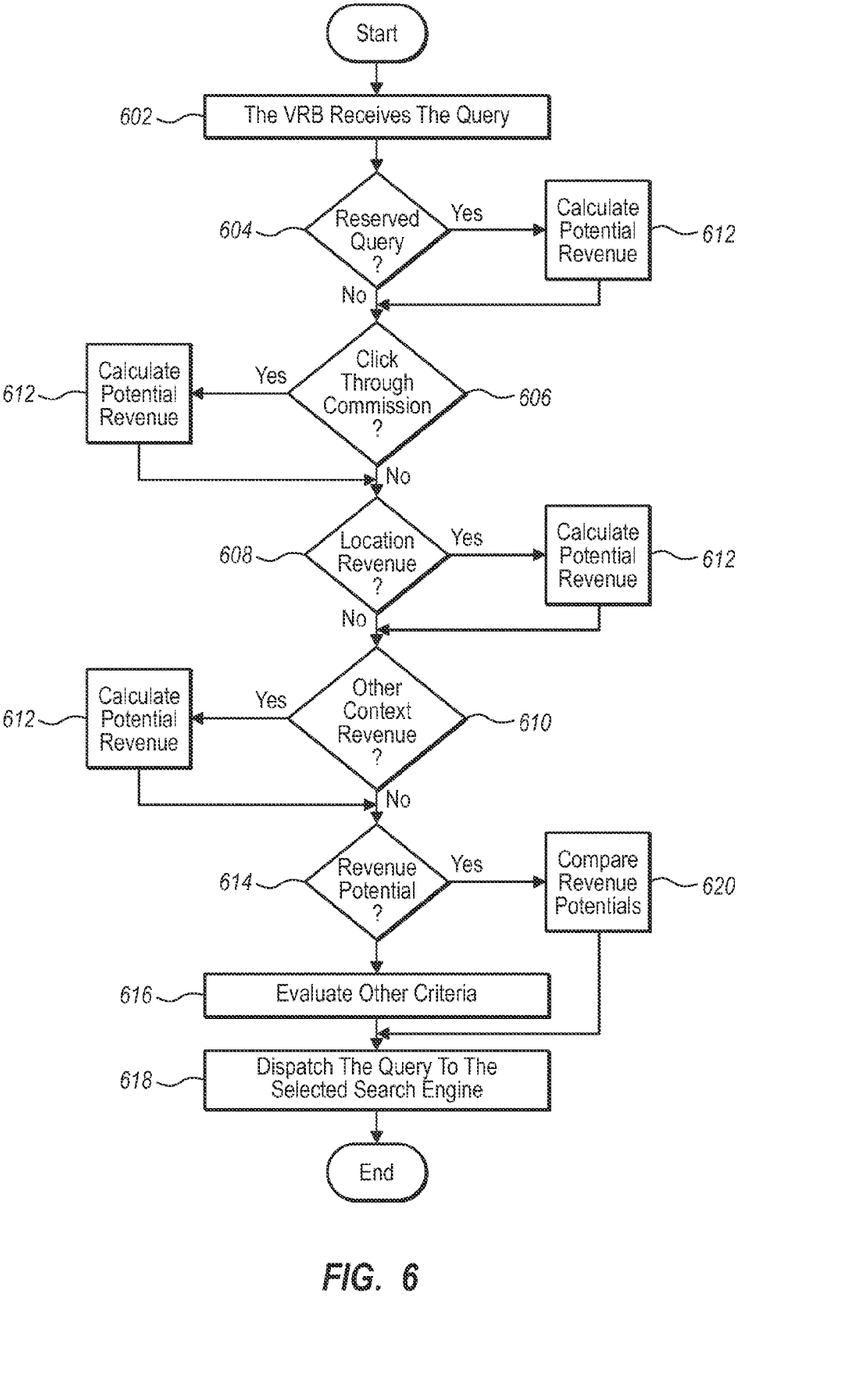
FIG. 6 illustrates a method for maximizing the potential revenue of a brokered search request.

In the embodiment of FIG. 6, a method is depicted for maximizing the potential revenue of a brokered search request. In this case, the expected monetization criterion has been assigned the greatest weight in the criteria weighting 223. The VRB may assess all applicable revenue producing criteria for a query and broker the search according to the criterion that produces the highest potential revenue. The VRB receives 602 a search query and begins analyzing the potential revenue producing criteria. The VRB may determine 604 whether the query comprises a reserved query. The VRB may determine 606 whether a clickthrough commission arrangement exists with any of the search engines, along with the commission rates and performance statistics for each search engine with which a clickthrough commission arrangement exists. The VRB may determine 608 whether a location-based criterion applies, such as when a search engine purchases queries originating from devices found within a particular geographic location. The VRB may also determine 610 whether other context-dependent arrangements exist, such as when a device manufacturer purchases a query initiated while a device user is in the "help" menu of the device. Any time a criterion applies, the VRB calculates 612 the potential revenue associated with the criterion and continues evaluating the other criteria. If one or more revenue potentials are calculated 614, the VRB compares 620 the potential revenues, and the criterion associated with the highest revenue potential determines the best-fit or selected search engine. The VRB then dispatches 618 the query to the selected search engine.

If no potential revenues are calculated 614 due to the absence of any applicable potential revenue producing criteria, 604, 606, 608 and 610, the VRB may evaluate the applicability 616 of other criteria to select a search engine. Other criteria may include a user's preferred search engine, the ability of a search engine to return rich content, and the like. Once the selection is made, the VRB dispatches 618 the query to the selected search engine. For instance, the VRB may dispatch the query to a search engine preferred by the user. Alternately, the VRB may dispatch the query to a search engine capable of returning rich content as a result or to whichever search engine is selected according to the criteria.

In the present embodiment, the VRB may dispatch the query to only one selected search engine, which search engine is selected according to a most heavily weighted applicable criterion. Alternately, the VRB can dispatch the query to multiple selected search engines, which search engines may be selected according to several of the more heavily weighted applicable criterion. In this case, the VRB receives results from the multiple selected search engines and may re-sort them according to result re-sorting criteria, search engine selection criteria or other criteria before transmitting them to the user.

In some embodiments, a mobile communication network—such as a Global System for Mobile communications network ("GSM network") or other mobile communication network—may include the VRB 106. In such embodiments, the device 102 may be a handheld wireless telecommunication device that may be configured to communicate using telephone calls via the mobile communication network. In greater detail, the mobile communication network may include one or more switches, such as a mobile switching center ("MSC"). The mobile communication network may also include one or more base station subsystems ("BSS"), which may include one or more base station controllers ("BSC"). The BSC may be connected to the MSC using an A interface of a GSM network or other suitable interface. The BSS may also include one or more base transceiver stations ("BTS"), which may be connected to the BSC using an A-bis interface of a GSM network or other suitable interface. The BTS may also be connected to a communication device (such as, the handheld wireless telecommunication device) using a wireless interface (such as an air or Um interface of a GSM network or other suitable wireless interface). The MSC may also be connected to a Home Location Register ("HLR") and/or a Visitor Location Register ("VLR"). If desired, some or all of the VRB 106 may be implemented in the MSC, the BSC, the BTS, the HLR, the VLR, other components of the mobile communication network, or any combination thereof. The mobile communication network, of course, could include other components in other configurations. Moreover, the mobile communication network is not required and the VRB 106 may be implemented in other suitable locations and/or components.

Embodiments of the present invention may be implemented in connection with a special purpose or general purpose telecommunications device, including wireless telephones and other telephony-enabled mobile devices, landline telephones, or special purpose or general purpose computers that are adapted to have telecommunications or data networking capabilities such as cable set top boxes or PCs. Embodiments within the scope of the present invention also include computer-readable media for carrying or having computer-executable instructions or electronic content structures stored thereon, and these terms are defined to extend to any such media or instructions that are used with telecommunications devices.

By way of example, and not limitation, such computer-readable media can comprise RAM, ROM, EEPROM, CD-ROM or other optical disk storage, magnetic disk storage or other magnetic storage devices, or any other medium which can be used to store desired program code in the form of computer-executable instructions or electronic content structures and which can be accessed by a general purpose or special purpose computer, or other computing device.

Combinations of the above should also be included within the scope of computer-readable media. Computer-executable instructions comprise, for example, instructions and content which cause a general purpose computer, special purpose computer, special purpose processing device or computing device to perform a certain function or group of functions.

Although not required, aspects of the invention have been described herein in the general context of computer-executable instructions, such as program modules, being executed by computers in network environments. Generally, program modules include routines, programs, objects, components, and content structures that perform particular tasks or implement particular abstract content types. Computer-executable instructions, associated content structures, and program modules represent examples of program code for executing aspects of the methods disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for a voice request broker server to broker a search request, the method comprising:
 at the voice request broker server, receiving a search request from a device;
 assessing the search request to select at least one computer search engine from among a plurality of computer search engines to process the search request;
 dispatching the search request to the at least one selected computer search engine;
 receiving a first list of one or more results from the at least one selected computer search engine;
 accessing a database of result criteria for determining an order for each of the one or more received results;
 applying the result criteria to each of the one or more received results to determine the order for the one or more received results;
 at the voice request broker server, re-sorting the one or more results into a second list that complies with the order determined by applying the result criteria;
 sending from the voice request broker server to the device the re-sorted second list of the one or more results;
 wherein assessing the search request to select at least one computer search engine comprises evaluating the applicability of search criteria to the search request; and
 wherein the search criteria comprise:
  whether the search request is reserved;
  a matched rating for a search engine;
  a commission a search engine pays to perform a search;
  a match between the search request and a specialty of a search engine;
  expected monetization of the search request;
  a location of the device transmitting the search request;
  a menu context of the device when the search request is initiated;
  a user's search engine preference;
  a user profile; and
  a search engine's ability to return rich content in the list of one or more results.

2. The method of claim 1, wherein receiving a search request further comprises:
 receiving a voice search request; and
 transcribing the voice search request to a text search request.

3. The method of claim 1, further comprising transmitting the second list to the device.

4. The method of claim 1, wherein the results criteria comprise one or more of:
 whether the search request is reserved by a search engine or other third party;
 a matched rating for a search engine;
 a commission a search engine pays to perform a search;
 a match between the search request and a specialty of a search engine;
 expected monetization of the search request;
 a location of the device transmitting the search request;

a menu context of the device when the search request is initiated;

a user's search engine preference;

a user profile; and a search engine's ability to return rich content in the list of one or more results.

5. The method of claim 4, wherein each result criterion is weighted and the weights of the applicable result criteria determine a new order into which the one or more results are re-sorted.

6. The method of claim 1, wherein each search criterion is weighted and the most heavily weighted applicable search criterion determines which of the plurality of computer search engines is selected to process the search request.

7. The method of claim 1, wherein each search criterion is weighted and the weights of the applicable search criteria determine which of the plurality of computer search engines is selected to process the search request.

8. The method of claim 1, wherein the device comprises a wireless communication device, further comprising selecting a dedicated key to initiate the search request.

9. The method of claim 1, wherein the at least one selected computer search engine comprises one or more of a traditional non-human, computerized search engine maintaining its own index, database or catalogue and a non-human, computerized meta-search engine that sends its search requests to traditional search engines and combines their results.

10. The method of claim 1, wherein with the order specified by the result criteria indicates that the second list remains unchanged from the first list.

11. A method for performing a search request at a voice request broker the method comprising:

receiving a search request from a communication device, the communication device associated with a carrier and the carrier being an entity associated with the voice request broker;

parsing the search request to identify one or more of a keyword, a search term or a query format;

accessing a database of search criteria at least in order to determine whether the search request is reserved by the carrier in order to provide customized results to the search request according to criteria of the carrier;

determining whether the search request is reserved by determining if the identified one or more keyword, search term, or query format has been reserved by the carrier;

in response to determining the search request has been reserved, transmitting the search request to a particular search engine associated with the carrier to perform a search such that the particular search engine returns particular results to the search request, the particular results being customized according to the criteria of the carrier and presented in a particular order according to the criteria of the carrier;

in response to determining the search request has not been reserved, at least partially using the search criteria to select one or more search engines to perform a search on the portion of the search request not reserved, wherein the one or more search engines may include the search engine dedicated to the entity that is associated with the voice request broker, and transmitting the portion of the search request not reserved to the selected one or more search engines;

receiving results from the one or more selected search engines;

at the voice request broker, receiving the search request from a device prior to parsing the search request; and after receiving the results from the one or more selected search engines, transmitting the results from the voice request broker to the device.

12. The method of claim 11, wherein the search request comprises a voice search request, further comprising transcribing the voice search request to a text search request.

13. The method of claim 11, wherein the device comprises a wireless communication device.

14. The method of claim 13, further comprising re-sorting the results prior to transmitting the results to the device using results criteria.

15. The method of claim 11, further comprising one or more of:

if a search request comprises a keyword, a search term or query format reserved by the entity that owns the voice request broker for a purchasing search engine, transmitting the search request to the purchasing search engine;

if two or more search engines have different matched ratings, transmitting the search request to the search engine with the highest matched rating;

if two or more search engines pay a commission per search request, transmitting the search request to the search engine paying the highest commission;

if a first search engine is better configured than a second search engine to process a particular search request, transmitting the search request to the first search engine;

if a geographically-specialized search engine is configured to produce results related to a particular geographic area, transmitting a search request originating from a device located within the particular geographic area to the geographically-limited search engine;

if a device user from which a search request originates specifies a preferred search engine, transmitting the search request to the preferred search engine;

if a search engine enables the return of rich content for the one or more results, transmitting the search request to the rich content enabled search engine; or if a search request produces potential revenue by being processed by either of two or more search engines, transmitting the search request to the search engine whose processing produces the most potential revenue.

16. The method of claim 11, wherein the search criteria are weighted and the one or more selected search engines are selected based on respective weights of the applicable search criteria.

17. A method for performing a search, the method comprising:

at a voice request broker receiving a verbal search request from a mobile communication device, wherein the verbal search request is converted to a text search request;

selecting at least one computer search engine from among a plurality of computer search engines to perform the search request using search criteria, the voice request broker having selected the at least one computer search engine based at least upon search criteria applicable to the search request;

dispatching the text search request to the at least one selected computer search engine;

receiving a plurality of results from the at least one selected computer search engine;

accessing results criteria for determining an order for each of the plurality of results;

re-sorting the plurality of results based on the results criteria at the voice request broker prior to transmitting the re-sorted results;

transmitting the re-sorted plurality of results to the mobile communication device;
wherein assessing the search request to select at least one computer search engine comprises evaluating the applicability of search criteria to the search request; and
wherein the search criteria comprise:
   whether the search request is reserved;
   a matched rating for a search engine;
   a commission a search engine pays to perform a search;
   a match between the search request and a specialty of a search engine;
   expected monetization of the search request;
   a location of the device transmitting the search request;
   a menu context of the device when the search request is initiated;
   a user's search engine preference;
   a user profile; and
   a search engine's ability to return rich content in the list of one or more results.

18. The method of claim 17, wherein selecting a computer search engine for the verbal search request further comprises one or more of:
   selecting the computer search engine based on a geographic location of the mobile communication device;
   selecting the computer search engine based on a reserved word included in the verbal search request;
   selecting the computer search engine based on a query format of the verbal search request;
   selecting the computer search engine based on a context of the mobile communication device;
   selecting the computer search engine based on a weight of each search criteria;
   selecting the computer search engine based on value of the search request to a carrier associated with the mobile communication device;
   selecting the computer search engine based on a user profile;
   selecting the computer search engine based on an ability of the selected computer search engine to return rich content;
   selecting the computer search engine based on a performance of the selected computer search engine, wherein the performance is represented in a confidence level that the results match the search request; and
   selecting the computer search engine based on an arrangement with a third party.

* * * * *